J. D. SMITH.
Grain Drill.
No. 35,713.    Patented June 24, 1862.
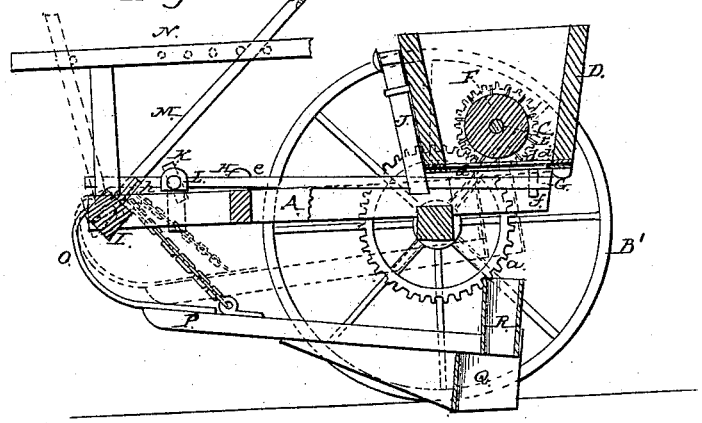
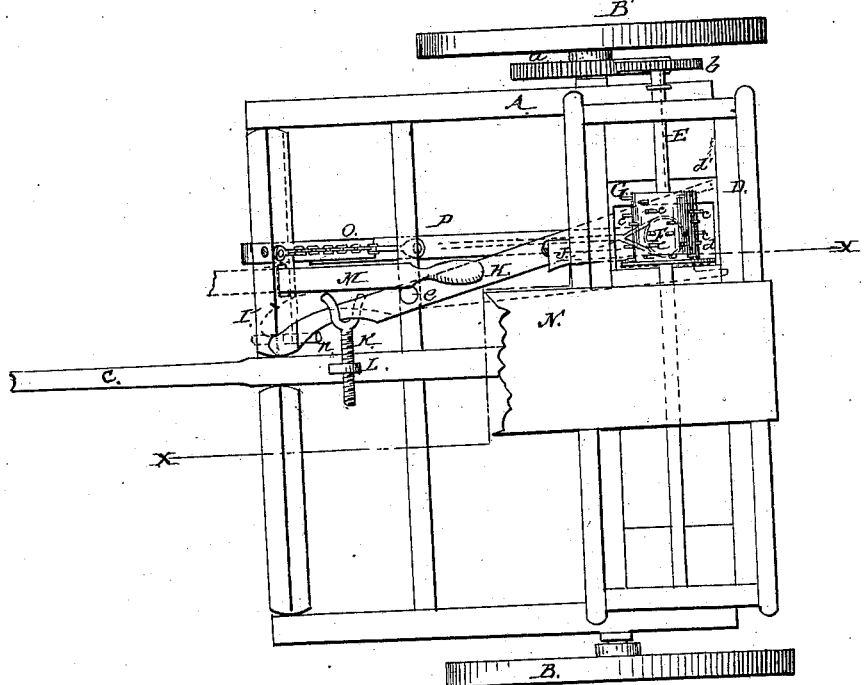
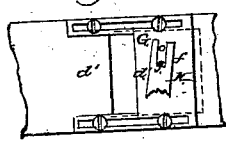 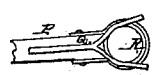
Witnesses:
Jno. Coombs
Geo. Reed
Inventor:
J. D. Smith
per Munn & Co
attorneys

UNITED STATES PATENT OFFICE.

J. D. SMITH, OF PEORIA, ILLINOIS.

IMPROVEMENT IN SEED-PLANTERS.

Specification forming part of Letters Patent No. 35,713, dated June 24, 1862.

*To all whom it may concern:*

Be it known that I, J. D. SMITH, of Peoria, in the county of Peoria and State of Illinois, have invented a new and Improved Seed-Planting Machine; and I do hereby declare that the following is a full, clear, and exact description of the same, reference being had to the accompanying drawings, making part of this specification, in which—

Figure 1 is a side sectional view of my invention, taken in the line $x$ $x$, Fig. 2; Fig. 2, a plan or top view of the same; Fig. 3, a detached inverted plan of the seed-gage; Fig. 4, a detached inverted plan of a seed-conveying tube and furrow opener or share.

Similar letters of reference indicate corresponding parts in the several figures.

This invention consists in a novel and useful arrangement of a seed-gage, levers, furrow-share, and certain other parts hereinafter fully shown and described, whereby the seed-gage is operated or adjusted automatically from the movement of the lever by which the furrow-share is raised and lowered, so that when it is designed to render the machine inoperative the driver by simply operating the lever which raises the furrow-share out of the ground will at the same time, and by the same manipulation, shut off the flow of seed from the seed box or hopper, the seed-gage at the same time admitting of being adjusted in various positions to regulate the flow or discharge of the seed as may be required when the machine is at work.

The invention also consists in attaching the furrow-share bar to the shaft by which it is raised and lowered, by means of a spring, substantially as hereinafter fully shown and decribed, whereby the furrow-share, when adjusted to its work, is kept into the ground, and at the same time allowed to yield or rise in order that it may pass freely over obstructions that may lie in its path, the spring permitting the furrow-share to be raised when the necessary parts are operated for that purpose.

To enable those skilled in the art to fully understand and construct my invention, I will proceed to describe it.

A represents a rectangular frame, which is mounted on two wheels, B B', and has a draft-pole, C, attached. On the back part of the frame A there is placed a seed box or hopper, D, which extends the whole width of the frame, and has within it a longitudinal shaft, E, which is rotated, as the machine is drawn along, by gearing $a$ $b$ from the wheel B'. On the shaft E there is placed a drum or cylinder, F, which is provided with teeth $c$.

In the bottom $d$ of the seed box or hopper D there is a rectangular opening, $d$, and to the under side of the bottom $d'$ there is attached a sliding plate, G, by adjusting which the opening $d$ may be entirely closed or diminished in area, as required. (See Fig. 3.) The opening $d$ admits of the seed being discharged from the seed box or hopper D, and said opening is directly underneath the drum or cylinder F. (See Figs. 1 and 2.) The plate G serves as a gage for regulating the discharge or flow of seed from the box or hopper D, and said gage is adjusted through the medium of a lever, H, which has its fulcrum at $e$ and is connected to the gage by means of a pendent pin, $f$, which is attached to the under side of the plate, fitting in a slot, $g$, in the back end of the lever. (See Fig. 3.) The lever H extends forward to the front part of the frame and projects over a shaft, I, at its front end. The shaft I has a pin, $h$, attached to it, which projects upward at the left-hand side of the lever H, and the latter is made to bear against or be pressed toward the former by a spring, J, which acts against lever H. (See more particularly Fig. 2.)

K is a set-screw which is fitted in a nut, L, attached to frame A, near its front part, and against which the lever H bears. This set-screw, by being adjusted in its nut L, regulates the position of the plate or gage G, so that the opening $d$ may be increased or diminished in area, as desired.

To the shaft I there is attached a lever, M, which extends upward above the driver's seat N, and to the shaft I there is attached, by means of a curved spring, O, a bar, P. This spring O has a tendency to keep the back part of the bar P pressed downward, and to the back part of said bar there is attached a furrow-share, Q, of forked form in its horizontal section, as shown in Fig. 4, and to bar P, directly over the fork of share Q, there is attached a seed-tube, R, which receives the seed from the opening $d$ through any suitable tube or spout.

The operation is as follows: When the machine is in operation the share Q forms the furrow, it being kept down in working position by the spring O, the tension of which may be regulated by adjusting lever M by securing lever M more or less in a backward position to the seat N by pins $a^\times$. The spring O at the same time admits of the furrow-share rising to pass over obstructions which may lie in its path. The seed is distributed through the opening $d$ by the revolution of the drum F, and the discharge of seed, as before stated, is regulated by adjusting lever H and the plate or gage G so as to make the opening $d$ of the required capacity. At any time when it is necessary to render the machine inoperative the driver shoves forward the lever M, and thereby turns the shaft I and elevates the share Q above the surface of the ground, and as the shaft I turns the pin $h$ actuates the lever H, which has an oblique position relatively with the pin, and this movement of lever H shoves the plate or gage G entirely across the opening $d$, and thereby prevents the escape of seed. Thus it will be seen that by simply operating the lever M, and by one and the same movement, the machine is rendered inoperative.

Having thus described my invention, what I claim as new, and desire to secure by Letters Patent, is—

1. The gage-plate G and lever H, arranged with the shaft I, provided with the pin $h$ and lever M, substantially as shown, to operate as and for the purpose set forth.

2. The set-screw K, in connection with lever H, gage-plate G, and spring J, for the purpose of regulating the discharge of the seed, as specified.

3. Attaching the furrow-share bar P to the shaft I by means of the spring O, as and for the purpose set forth.

J. D. SMITH.

Witnesses:
BERNARD BAILY,
JOHN WATSON.